March 4, 1958 — A. J. FISCHER — 2,825,691
TREATING IMPURE LIQUIDS
Filed Aug. 26, 1949 — 3 Sheets-Sheet 1
FIG. 1.
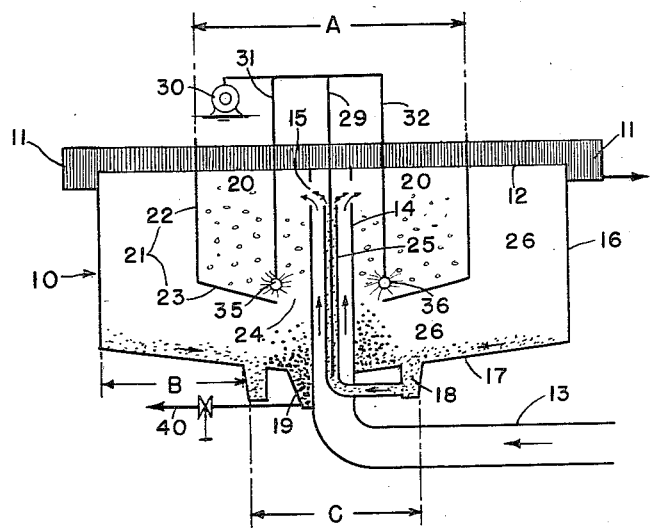
FIG. 2.
FIG. 3.
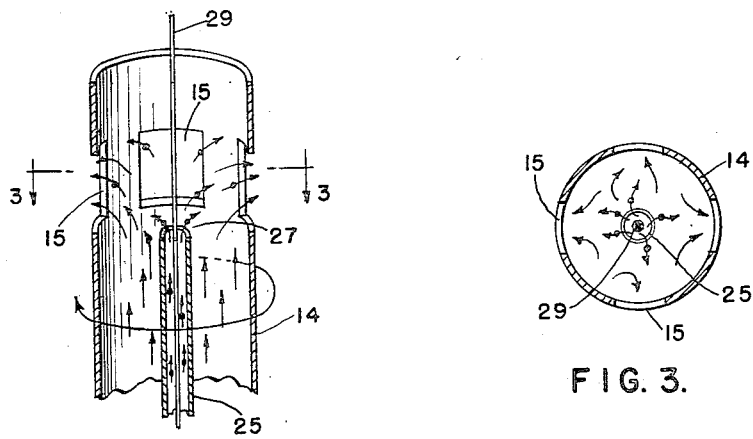
INVENTOR:
ANTHONY J. FISCHER,
BY
ATTORNEY March 4, 1958  A. J. FISCHER  2,825,691
TREATING IMPURE LIQUIDS
Filed Aug. 26, 1949  3 Sheets-Sheet 2

INVENTOR:
ANTHONY J. FISCHER,
BY
Arthur Middleton
ATTORNEY

INVENTOR:
ANTHONY J. FISCHER,
BY
Arthur Middleton
ATTORNEY

United States Patent Office 2,825,691
Patented Mar. 4, 1958

2,825,691

TREATING IMPURE LIQUIDS

Anthony J. Fischer, Manhasset, N. Y., assignor to Dorr-Oliver Incorporated, a corporation of Delaware Application August 26, 1949, Serial No. 112,435

17 Claims. (Cl. 210—49)

This invention relates to the clarification of contaminated turbid liquids such as sewage and other polluted waste liquids, in a sedimentation tank wherein flocculation of suspended particles of turbidity also is effected to render the sedimentation more efficient. Such a combined flocculation and sedimentation liquid-clarifying apparatus is disclosed in the patent to Darby et al. No. 2,143,750, patented January 10, 1939. In that tank-like apparatus the raw feed of contaminated liquid to be clarified is supplied first to an open-bottom flocculation zone or compartment co-axially positioned within a sedimentation tank. Suspended particles of turbidity are flocculated in that compartment and then descend driftingly therefrom directly into the surrounding quiescent zone or compartment where sedimentation takes place of the suspended flocs that have been rendered settleable. Sediment so formed on the bottom of the tank is slowly and non-roilingly raked to a central discharge sump and discharged from the tank while clarified effluent flows over a weir at the top of the tank going to use or to further treatment.

This invention comprises an improvement on that type of apparatus, which however may be rectangular instead of round as illustrated in the drawings and described herein, by effecting a further flocculation of those less-readily settleable solid particles of turbidity. When the turbid liquid emerges or descends from the open-bottomed flocculation compartment, some of the finer suspended solids may not be flocculated as well as they might be, so they tend to remain in suspension and so migrate ultimately to positions adjacent the wall of the tank. They settle finally by descending in an outer zone or zone adjacent the tank wall where they collect as sediment or sludge. Thus there is presented on the floor or bottom of the tank sludge which comprises significantly heavier settled solids such as grit and completely flocculated solids while therearound the sludge comprises significantly lighter solids. Therefore, this invention resides in raking the sludge of these lighter solids to a place on the tank floor where they are collected, while the sludge of heavier solids is raked to discharge as usual. The collected lighter solids which are more beneficial in coagulating finely divided matter present in raw sewage are then mixed and commingled with incoming raw feed suspended solids and the mixture released into the flocculation compartment wherein these re-suspended previously-settled lighter solids serve to act as nuclei for attachment of the finer suspended solids of the raw feed— all in the same place. The invention further includes the return of these previously-settled lighter solids to the point of their admixture with the incoming raw solids by means of an air-lift with the result that these previously-settled lighter solids adsorb some air so that they are made somewhat oxidized. In this condition they tend to remain fresh longer in the flocculation compartment which assures good flocculation of them since there is little, if any, tendency of them to turn septic in the flocculation compartment due to anaerobic action of bacteria.

To further insure against septic action this returned light sludge fraction may be separately aerated for a time before they are returned to the raw sewage.

Whereas in that Darby et al. patent, flocculation in the flocculation zone is effected by the use of moving paddles or blades, this invention includes a different kind and type of floc-initiation, namely, bubbling air upwardly through the flocculation compartment from a series of air-diffusing elements placed submergedly about the lower section of the flocculation compartment in such a manner that excessive agitation is avoided.

As illustrative of certain different embodiments of this invention, reference is made to the accompanying drawings in which—

Fig. 1 is a digrammatic view illustrating a clarification apparatus shown in vertical section.

Fig. 2 is a vertical sectional view of an upper terminal portion of a central feed conduit and of an inner air-lift tube for conducting light raked solids collected from a sedimentation operation into the incoming feed.

Fig 3 is a horizontal sectional view taken as on the line 3—3 of Fig. 2 looking in the direction of the arrows. The parts shown in Figs. 2 and 3 are shown at larger scale than in Fig. 1.

Figure 4:
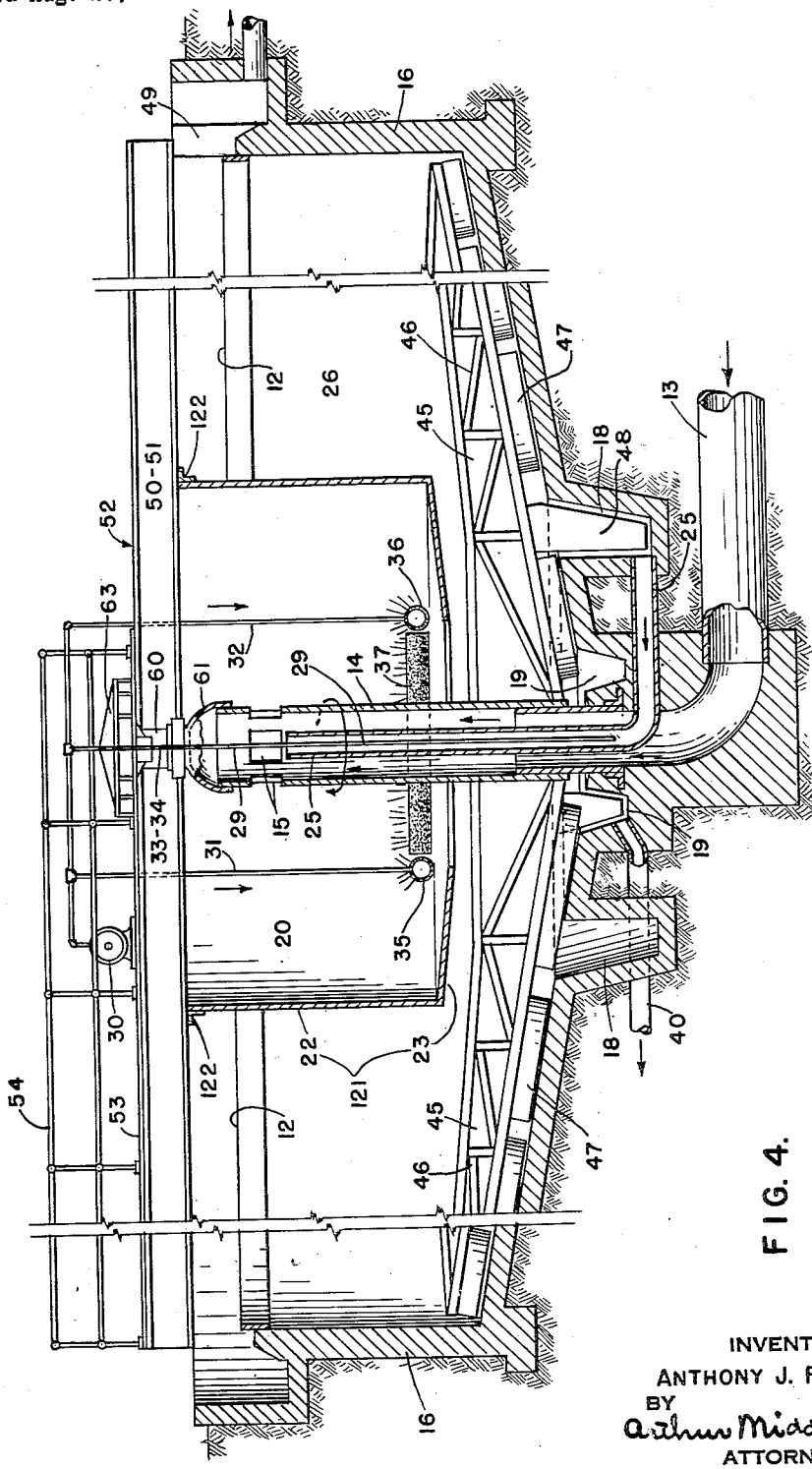
Fig. 4 is a vertical cross-sectional view of one form of clarifier for realizing the invention hereof.

In the diagrammatic illustration of Figs. 1, 2 and 3 there is indicated a clarification tank 10 (or sedimentation tank as it is often referred to) having an effluent launder 11 provided with an overflow edge 12 that determines the normal operative liquid-level of the liquid undergoing clarification within the tank. This tank has a feed-supply pipe 13 with a riser terminal discharge pipe section 14 that submergedly emits liquid, as for example incoming raw sewage to be treated, into the upper central portion of the tank, namely, at an elevation of the emission ports 15 which is somewhat lower than that of the effluent overflow edge 12 referred to but more particularly at elevation substantially above the bottom 17 of the sedimentation tank. The feed thus delivered is received within a flocculation zone or compartment 20 provided by an open bottom tank-like structure 21 embodying an inwardly disposed cylindrical wall 22 and an annular inwardly and downwardly sloping floor section or shelf 23 leaving a circular opening 24 about the rising feed-discharge section 14. The sloping floor section or shelf 23 is vertically spaced above the bottom of the tank and is substantially lower than the locality whereat the incoming feed is initially delivered for treatment.

The tank 10 has a marginal wall 16 and a bottom 17 the latter of which is provided with an annular depressed portion or trench 18 for receiving sludge of slower settling solids settling thereto from an annular settling zone 26 provided between the inwardly disposed wall 22 and the marginal wall 16 of the tank. The settling zone 26 may be viewed as extending inwardly into the region immediately below the sloping floor section 23 of the flocculating compartment 20.

The main tank 10 also has a depressed section or sump 19 in the central portion of the tank bottom for receiving and collecting sludge of quicker settling solids gravitating directly thereinto from the feed emitted into the central zone 20, from which sump it is passed to discharge.

In the apparatus of Figs. 1, 2 and 3, there is employed an air-lift pipe 25 leading from the annular trench 18 of the tank bottom 17 upwardly within the much larger feed pipe section 14. There is also employed an air-supply pipe 29 extending downwardly within the air-lift pipe 25. This air-supply pipe 29 is provided whereby as air is submergedly delivered under pressure within the air-lift pipe 25 the resulting air bubbles serve to convey, pump, or lift the liquid with light solid particles therein from the annular trench 18 and to deliver them in the region 27 within the lift pipe 25 in a manner to effectively intermix the conveyed and aerated solids with the incoming feed.

In Figs. 2 and 3 the flow-paths of incoming feed are indicated by plain shafted arrows while the flow-paths of conveyed aerated solids are indicated by the arrows having small dots on the shafts of the arrows indicating air or air-bubbles adsorbed by such lifted solids.

Figure 5:
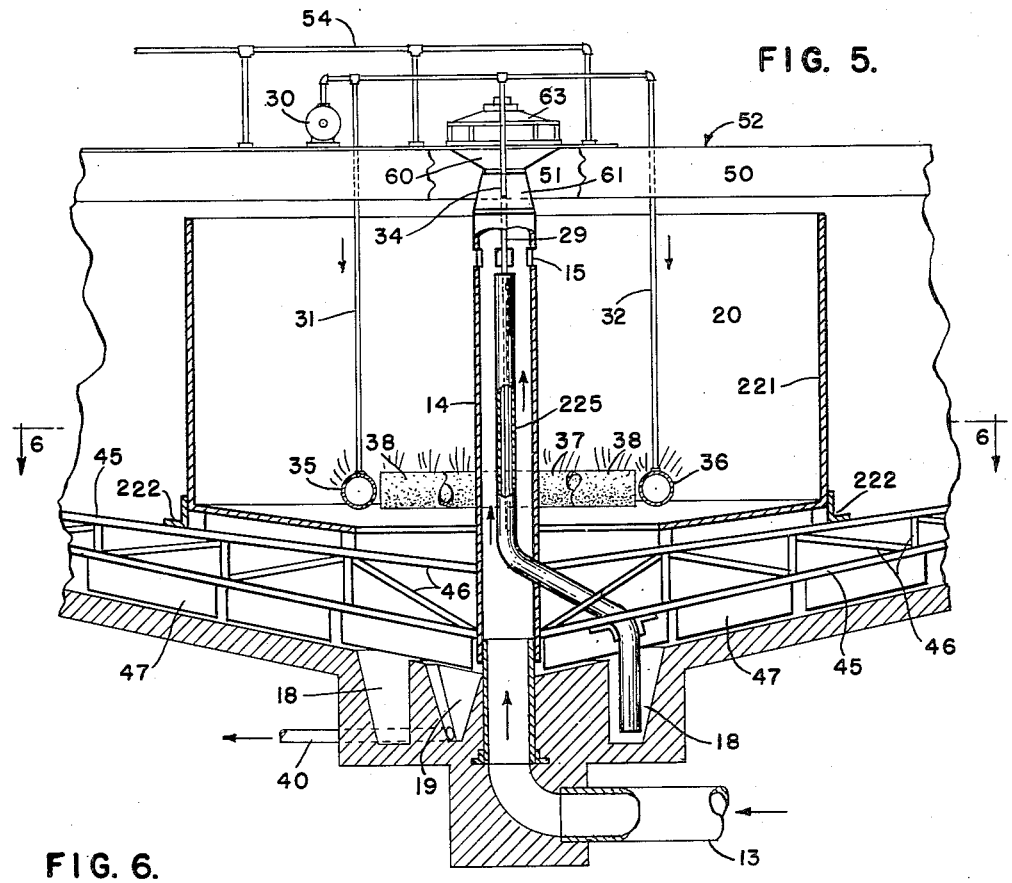
Figs. 5 and 6 are respectively vertical and horizontal sectional views of the central portion of a modified form of clarifier having the same functional arrangement of the parts shown in Fig. 4 but of which in the modified form certain parts have physical embodiments somewhat different from that of Fig. 4.
Figure 6:
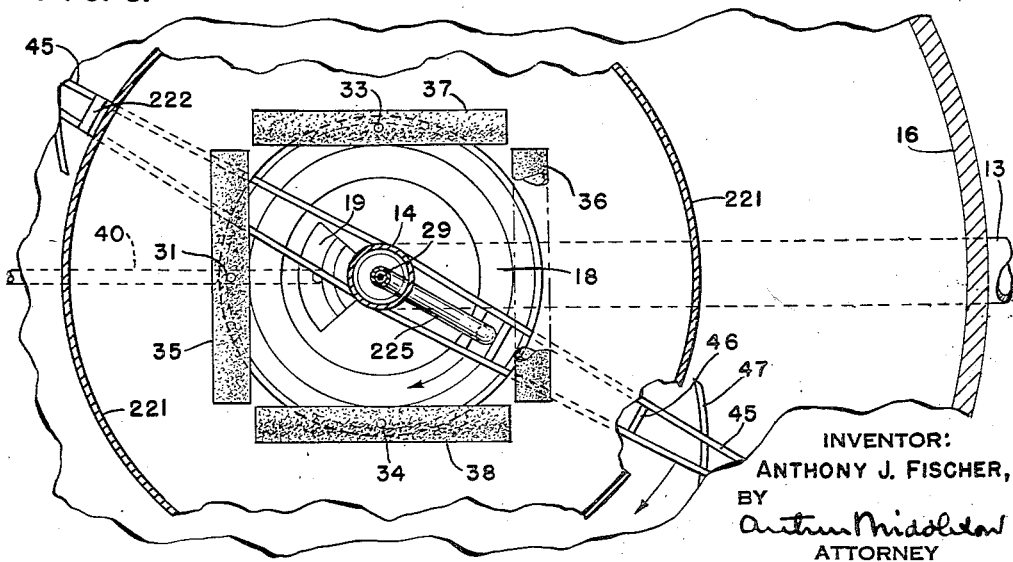

In Fig. 1, amplified by the showing of Figs. 5 and 6, there is indicated a motivated air blower or pump 30 herein referred to as a pressure-air supply means having branching air lines 29, 31 and 32, 33 and 34, that are herein referred to and preferably designated as pressure-air conducting tubes, and of which the air branch lines 31, 32, 33 and 34 are provided at the lower ends thereof with porous air-distributing means as 35, 36, 37 and 38, horizontally disposed within the lower interior portion of the flocculating compartment 20. The air thus submergedly but dispersedly delivered into the lower portion of flocculation compartment 20 aids in automatically purifying the incoming feed liquid and also in developing floc nuclei or augmenting the size of the floc particles whereby there also results a progressive amount of solids conditioned for more rapid settling that settle and collect within the central depressed sump 19 from which they are passed as sludge at the will of an operator as through a valve-controlled discharge line 40.

As the apparatus functions the further aerated liquid passes from the flocculation zone 20 downwardly through the opening 24 from whence it takes a path into and ultimately upwardly within the sedimentation zone wherein there takes place the settling out of the slower settling solids and the ultimate release of clarified liquid as overflow past weir edge 12, thence into the effluent launder 11 from which it passes outwardly along a pathway or conduit leading from the tank 16.

In diagrammatic Fig. 1, the arrow with the letter A indicates the diameter of the flocculation compartment 20; the arrow and letter B the horizontal width of the annular zone on the tank bottom on which settles slower settling solids from the sedimentation zone 26 that upon being raked are received and collected in annular trench 18; and the arrow and the letter C the diameter of the central zone on which more rapidly settling solids collect are raked into sludge sump 19.

As to the form of apparatus shown in Fig. 4, it will be noted that the tank construction is substantially like that of Fig. 1; that the incoming feed is delivered to the tank through the feed-supply means 13 and that the normal operative liquid-level of the liquid within the tank is determined by the overflow edge 12. The marginal wall 16 has upward extensions constituting posts 49 for supporting a set of horizontal cross beams 50 and 51 of a frame-carrying structure 52 providing a walkway 53 having guard rails 54. The supporting structure thus provided carries the motivated air blower or pump 30 and the depending air pipes 29, 31, 32, 33 and 34, in any suitable manner. The structure 52 also serves as a means for supporting a motivated gear actuating mechanism collectively designated 60 and from a turnable member 61 on which there is supported through the medium of a cap member 63 riser section 14 of the feed means constituting the terminal member of the feed-supply means 13. This riser member 14 not only provides a rotatable feed delivery member but also provides a turnable shaft from the lower end of which there is carried sediment-raking members 45 embodying structural arms 46 and raking blades 47 extending downwardly from said arms and functionable when travelling for impelling non-roilingly sedimented material or sludge on the bottom of the tank progressively inward as the riser section 14 turns. The turnable riser 14 and rake construction 45 just referred to turns about a vertically-extending axis and functions in the manner indicated; in fact, this portion of the structure is quite similar to that shown and described in the Darby et al. Patent 2,143,750 previously referred to, so further description thereof is deemed to be unnecessary.

The foregoing tersely describes the manner in which the structure 45 operates as a single mechanism to progressively impel settled or sedimented solids in the form of sludge inwardly into the annular depressed trench 18 and whereby the innermost portion of the rakes also impel quicker settling settled solids into the lower depressed central sump 19 of the tank floor. It will also be observed that there is affixed to structure 45 an upright scraper 48 which extends downwardly into annular trench 18 and which functions when structure 45 is traveling to impel non-roilingly the accumulated sludge collected in annular trench 18 towards the inlet of pipe 25.

In the form of apparatus shown in Fig. 4, it is to be noted that an open bottom tank-like structure 121 providing therein a flocculation compartment 20 is employed. This tank structure 121 is stationarily mounted with respect to the sedimentation tank 10 through the medium of connecting angles 122 that are secured to the horizontals 50 and 51. Within this flocculation compartment 20 there is carried from the lower end of the branching air-lines 31, 32, 33 and 34 porous air-distributing or diffusing means 35, 36, 37 and 38 arranged in horizontal plan as shown in Fig. 6. The air thus supplied by these porous air-distributing means is provided for aerating the liquid therein and in the development of flocculatable matter into flocs and also in the development of solid particles in the liquid into larger particles which will readily gravitate and settle under the general downflow conditions maintained within the tank, whereby the heavier or larger solids pass or are passed into the sludge sump 19 while the lighter and slower settling solids pass with the flowing liquid outwardly below the sloping or flat shelf or floor sections 23 of the flocculation zone or well into the settling zone 26. In this settling zone the remaining lighter slower settling solids settle out, are collected in the annular trench from which they are withdrawn, aerated and delivered as seed material into the incoming feed as supplied for treatment.

In this apparatus it will be noted there is employed a stationarily positionable air-lift pipe 25 which receives the light settled solids collecting and impelled thereto by upright scraper blade 48 in the annular depressed portion 18 and which are lifted because of the supply of air under pressure through the branching air-line 29 whereby the solids thus lifted are delivered as aerated solids which are delivered into the incoming feed, so as to be mixed therewith at the emission elevation 15 within the terminal pipe section 14. As the rakes function, they progressively impel the lighter slower settling settled solids whereby a supply thereof is available for receiving this aeration treatment for being so supplied to the emitted incoming feed and that this pre-treated fed material also receives further aeration treatment because of the air-delivery into the lower portion of the flocculation compartment through the medium of the porous air-diffusing members 35, 36, etc.

The treatment carried out in the flocculation zone results in a certain amount of heavy quicker settling solids which pass through the circular opening 24 and gravitate or settle on the floor region within the annular trench portion 18. The inner or more centrally located rakes progressively impel these heavy quicker settled solids to a locality whereat they drop into the sump 19 and from which they can be conveyed as and when required through the medium of the valve-controlled discharge line 40.

In the form of apparatus shown in Fig. 5, the flocculation compartment 20 is provided by and within an open bottom tank-like structure 221 which is mounted through the medium of connecting members 222 directly upon the rake structure 45 whereby this tank 221 moves with the rake structure. In this arrangement, the air-lift pipe which is designated as 225 is connected so that it is turned or rotatable about a vertical axial line concentric with that of the rotatable riser discharge section 14 which as in the form of Fig. 4 constitutes a shaft portion of a sediment-raking mechanism. The branching airline 29 extends downwardly within this air-lift pipe 225, so that it functions in identically the same manner as that heretofore described in connection with the stationary air-lift pipe 25 of Fig. 4. In connection, however, with the form of Fig. 5, the lower or intake end of the air-lift pipe 225 travels along around as a unit with the rake structure 45 and extends downwardly within the annular depressed trench 18. Otherwise, the structure and functioning of the apparatus of Fig. 5 is identical with that of Fig. 4.

Fig. 6 is a plan view partially in section of the construction shown in Fig. 5. The operations carried out in the forms of apparatus of Figs. 4 and 5 are substantially the same as that described in the diagrammatic Fig. 1 and structural Figs. 2 and 3.

In the form of Figs. 1 to 6 inclusive there is an open bottom aeration tank as 21 of Figs. 1, 121 of Fig. 4, or 221 of Fig. 5 that is located within the clarification tank 10. As has heretofore been pointed out each of said open bottom tanks has an annular bottom member or shelf 23 providing a central downflow or down-pass opening 24 and marginal wall 22 extending upwardly from said bottom to an elevation higher than that of the overflow weir edge 12 of tank 10. While the annular bottom 23 is submerged within the tank 10, nevertheless, it is at elevation above that of the bottom 17 of the tank 10 whereby there is provided the annular settling zone 26 which extends from the region below the annular tank bottom 23 outwardly into and upwardly within the region outside of the marginal wall 22 of the open bottom aeration tank of the marginal wall 16 of the clarification tank 10. Also in the forms of apparatus of Figs. 1 to 6, it will be noted that the raw sewage is passed and delivered directly into the upper portion of the open bottom aeration tank 21, 121 or 221 as the case may be. The flow-path of the raw sewage is from the supply pipe 13 through a riser terminal discharge section 14 provided as by a turnable supporting member having port openings as at 15 from which there passes the raw sewage directly into the open bottom aeration tank corresponding thereto. From the discharge passageway of this aeration tank the heavy solids such as grit can readily settle out of the raw sewage and pass therefrom as heavy sandy sludge which is received into the sludge sump 19 at the central portion of the tank bottom 17.

Also in each of the forms in Figs. 1 to 6 there is contemplated the employment of sediment-raking mechanism as 45 constructed for inwardly impelling light settled solids from out-lying floor sections of the clarification tank 10 towards and into the annular depressed portion or trench 18 and also for conveying the heavier solids from the inlying floor region within the boundaries of the trench 18 into the heavy sludge-receiving sump 19.

What I claim is:

1. The continuous process for treating turbid liquids for flocculation and sedimentation of finely divided solids suspended therein, which comprises establishing and maintaining in an everchanging body thereof with a fixed liquid level a sedimentation zone, and a flocculation agitation zone shielded entirely sidewise and partially bottomwise from the sedimentation zone; forcibly introducing turbid liquid to be treated submergedly and radially into the upper portion of the zone of flocculation agitation; flocculating suspended solids therein and conditioning the thus formed flocs therein for rapid settling; passing by gravity flow liquid and settleable solids comprising flocculated solids through the unshielded portion of the bottom the zone of flocculation agitation directly into the sedimentation zone and settling solids therein; withdrawing clarified effluent from the zone of sedimentation substantially at the top of the body while collecting and withdrawing as sludge settled solids from the bottom of the sedimentation; and recirculating a sludge of settled but incompletely flocculated solids substantially uncontaminated by the more rapidly settleable solids from the sedimentation zone to the upper portion of the zone of flocculation agitation.

2. The continuous process for treating turbid liquids for flocculation and sedimentation of finely divided solids suspended therein, which comprises establishing and maintaining in an everchanging body thereof with a fixed liquid level a sedimentation zone, and a flocculation agitation zone shielded entirely sidewise and partially bottomwise from the sedimentation zone; forcibly introducing turbid liquid to be treated submergedly and radially into the upper portion of the zone of flocculation agitation; flocculating suspended solids therein and conditioning the thus formed flocs therein for rapid settling; passing by gravity flow liquid and settleable solids comprising flocculated solids through the unshielded portion of the bottom of the zone of flocculation agitation directly into the sedimentation zone and settling solids therein; withdrawing clarified effluent from the zone of sedimentation substantially at the top of the body while collecting and withdrawing as sludge settled solids from the bottom of the sedimentation zone; recirculating a sludge of settled but incompletely flocculated solids substantially uncontaminated by the more rapidly settleable solids from the sedimentation zone to the upper portion of the zone of flocculation agitation by collecting and withdrawing from the sedimentation zone as sludge settled but incompletely flocculated solids substantially uncontaminated by the more rapidly settleable solids; transferring said uncontaminated, incompletely flocculated solids sludge and minglingly mixing it with the incoming turbid liquid to be treated.

3. The process according to claim 2 wherein the mixing of the said uncontaminated, incompletely flocculated solids sludge with incoming turbid liquid is effected in the region whereat the incoming polluted liquid is forcibly and radially introduced into the zone of flocculation agitation.

4. The process according to claim 2 wherein more rapidly settleable solids are settled in a region of the settling zone substantially aligned with the unshielded portion of the bottom of the zone of flocculation agitation, are collected along the bottom of said region, and are withdrawn therefrom while incompletely flocculated solids are settled in the region between the first region and the periphery of the sedimentation zone, collected as sludge along the bottom of the second region, and then non-roilingly impelled towards a point of withdrawal in said second region whereat said sludge is separately withdrawn substantially uncontaminated by the more rapidly settleable solids.

5. The process according to claim 2 wherein the said uncontaminated, incompletely flocculated solids sludge is transferred from the point of withdrawal from the zone of sedimentation to the zone of flocculation agitation in a generally vertical rising separate liquid stream motivated by uprising gas bubbles.

6. The process according to claim 2 wherein the said uncontaminated, incompletely flocculated solids sludge is aerated in transit before being minglingly mixed with the incoming turbid liquid.

7. A combined flocculation and sedimentation apparatus for treating turbid liquids, which comprises a sedimentation tank having a peripheral wall, an upper peripheral discharge means for clarified liquid, a lower discharge means for settled solids, and means for non-roilingly moving settled solids along the bottom of the tank towards the lower discharge means; a shielded flocculation compartment within the tank characterized by an imperforate peripheral wall spaced substantially from the wall of the tank, and a downwardly inclined floor spacedly above the bottom of the tank with a downflow passageway through said floor substantially aligned with the lower discharge means; means within the compartment for inducing flocculation agitation and floc conditioning; feed means for forcibly introducing turbid liquid to be treated submergedly and radially into the upper portion of the flocculation compartment; means adjacent the lower settled solids discharge means adapted for collecting and withdrawing sedimented slower settleable solids as sludge substantially uncontaminated by the more rapidly settleable solids; and means for the forcible conveyance of said slower settleable solids sludge into the upper part of the flocculation compartment into the region whereat the feed means discharge.

8. An apparatus according to claim 7 wherein the means for collecting and withdrawing the said sedimented slower settleable solids sludge substantially uncontaminated by the more rapidly settleable solids comprise a trench adjacent the lower discharge means, and a conduit leading therefrom which is operatively associated with the means for the forcible conveyance of said slower settled solids sludge into the upper portion of the flocculation compartment.

9. An apparatus according to claim 7 wherein the forcible conveying means for the slowly settled solids comprises gas lift means.

10. A combined flocculation and sedimentation apparatus for treating turbid liquid containing finely divided solids in suspension which comprises a sedimentation tank having a peripheral wall, an upper peripheral discharge means for clarified liquid, a lower discharge means for settled solids, and means for non-roilingly moving settled solids along the bottom of the tank towards the lower discharge means; a shielded flocculation compartment within the tank characterized by an imperforate peripheral wall spaced substantially from the wall of the tank, and a downwardly inclined floor spacedly above the bottom of the tank with a downflow passageway through the floor substantially aligned with the lower discharge means; means within the sludge compartment overlying the downwardly inclined floor and spaced from the peripheral wall of the flocculation compartment for emitting uprising currents of agitation inducing air bubbles; feed means for forcibly introducing turbid liquid to be treated submergedly and radially into the upper portion of the flocculation compartment; the improvement comprising means adjacent the lower settled solids discharge means adapted for collecting and withdrawing sedimented slower settleable solids as sludge substantially uncontaminated by the more rapidly settleable solids; and means for the forcible conveyance of said slower settleable solids sludge into the upper part of the flocculation compartment into the region whereat the feed means discharge.

11. An apparatus according to claim 10 wherein the means for collecting and withdrawing the said slower settleable settled solids sludge substantially uncontaminated by the more rapidly settleable solids comprise an outwardly lying trench adjacent the lower discharge means, and a conduit leading therefrom which is operatively associated with the means for the forcible conveyance of said slower settled solids sludge into the upper portion of the flocculation compartment.

12. An apparatus according to claim 10 wherein the forcible conveying means for the slowly settled solids comprises gas lift means.

13. A combined flocculation and sedimentation apparatus for treating turbid liquids which comprises a round sedimentation tank having a peripheral wall, an upper peripheral discharge means for clarified liquid, a lower central discharge means for settled solids, and rotatable sediment raking means for the non-roilingly moving of settled solids along the bottom of the tank towards the lower central discharge means; a round shielded flocculation compartment concentrically disposed within the tank, which comprises a cylindrical imperforate peripheral wall spaced substantially from the wall of the tank and an annular shelf at the bottom of the cylindrical wall extending inwardly and inclined downwardly towards the center of the tank and spacedly above the bottom of the tank, which shelf encircles a central downflow passageway substantially aligned with the lower central discharge means; means in the flocculation compartment overlying the annular shelf and substantially adjacent the downflow passageway for emitting uprising currents of agitation inducing air bubbles; central feed means for forcibly introducing turbid liquid to be treated submergedly and radially into the upper portion of the flocculation compartment; means adjacent to the lower central discharge means adapted to collect and withdraw settled solids as sludge substantially uncontaminated by the more rapidly settleable solids; and means for the forcible conveyance of said sludge into the upper central portion of the flocculation compartment into the region whereat the feed means discharge.

14. An apparatus according to claim 13 wherein the means for collecting and withdrawing the said sludge comprises a concentrically disposed, outlying, annular trench adjacent the lower central discharge means, and a conduit leading therefrom which is operatively associated with the means for the forcible conveyance of said sludge into the upper portion of the flocculation compartment.

15. An apparatus according to claim 13 wherein the means for collecting and withdrawing the said sludge substantially uncontaminated by the more rapidly settleable solids comprises a concentrically disposed, outlying annular trench adjacent the lower central discharge means; and a conduit extending from the interior of the outlying annular trench, which rises up through the central downflow passageway to terminate in the upper central part of the flocculation compartment in the region whereat the feed means discharge, and is operatively associated with means for forcibly lifting sludge therethrough, and which conduit is connected to the rotating sediment raking means whereby the intake end of the conduit in the annular trench rotates with the sediment raking mechanism about the center of the tank.

16. An apparatus according to claim 13 wherein the feed means comprises a centrally disposed conduit vertically rising from and through the bottom of the tank and terminating below the top of the tank but in the upper portion of the flocculation compartment.

17. An apparatus according to claim 13 wherein the feed means comprises a centrally disposed conduit, vertically rising from and through the bottom of the tank and terminating below the top of the tank but in the upper portion of the flocculation compartment, wherein the means for the forcible conveyance of said sludge into the upper central portion of the flocculation compartment is disposed within the feed means conduit and terminates in a region whereat the feed means conduit terminates.

References Cited in the file of this patent

UNITED STATES PATENTS

| | | |
|---|---|---|
| 2,076,529 | Durdin | Apr. 13, 1937 |
| 2,400,598 | Prager | May 21, 1946 |
| 2,568,452 | Kelly et al. | Sept. 18, 1951 |